United States Patent
Jane Santamaria

(10) Patent No.: US 7,726,731 B2
(45) Date of Patent: Jun. 1, 2010

(54) DEVICE FOR REMOVABLY FITTING TO PRAMS CARRYCOT SEATS AND CARRYCOTS BEING PROVIDED WITH AN ARTICULATED HANDLE

(75) Inventor: Manuel Jane Santamaria, Palau De Plegamans (ES)

(73) Assignee: Jane S.A., Barcelona (ES)

( * ) Notice: Subject to any disclaimer, the term of this patent is extended or adjusted under 35 U.S.C. 154(b) by 0 days.

(21) Appl. No.: 11/787,164

(22) Filed: Apr. 12, 2007

(65) Prior Publication Data

US 2007/0246976 A1 Oct. 25, 2007

(30) Foreign Application Priority Data

Apr. 12, 2006 (ES) .............................. 200600853 U

(51) Int. Cl.
A47C 13/00 (2006.01)
A47D 1/10 (2006.01)

(52) U.S. Cl. ................. 297/130; 297/183.4; 297/256.16

(58) Field of Classification Search ................. 297/130, 297/184.13, 184.12, 183.3, 256.16, 250.1
See application file for complete search history.

(56) References Cited

U.S. PATENT DOCUMENTS

| 4,516,806 | A | * | 5/1985 | McDonald et al. | ..... | 297/452.13 |
| 4,634,177 | A | * | 1/1987 | Meeker | ................. | 297/256.13 |
| 4,744,599 | A | * | 5/1988 | Jankowski et al. | ..... | 297/256.16 |
| 5,277,472 | A | * | 1/1994 | Freese et al. | ................. | 297/130 |
| 5,522,639 | A | * | 6/1996 | Jaime | ..................... | 297/184.13 |
| 6,318,807 | B1 | * | 11/2001 | Perego | .................. | 297/440.22 |
| 6,695,400 | B2 | * | 2/2004 | Washizuka et al. | .......... | 297/130 |
| 6,715,828 | B1 | * | 4/2004 | Cheng | ..................... | 297/183.3 |
| 6,983,986 | B2 | * | 1/2006 | Jane Santamaria | .......... | 297/130 |
| 7,455,354 | B2 | * | 11/2008 | Jane Santamaria | ....... | 297/183.4 |
| 2004/0164593 | A1 | * | 8/2004 | Jane Santamaria | .......... | 297/130 |
| 2005/0184564 | A1 | * | 8/2005 | Takamizu et al. | ........... | 297/130 |

FOREIGN PATENT DOCUMENTS

EP 1437285 7/2004
ES 1053703 5/2003

* cited by examiner

*Primary Examiner*—David Dunn
*Assistant Examiner*—James Alex
(74) *Attorney, Agent, or Firm*—Merchant & Gould P.C.

(57) ABSTRACT

This device includes anchoring mechanism being actuated by a rope and fitted to respective attachments being provided on the pram. The device has two portions namely being a first one (1) being provided at the lower end of the handle and having a cavity (5) in an angularly tiltable arrangement housing an action element (6) being fit to act on the anchoring mechanism (7), and a second portion (2) being solid with the carrycot seat (4) or carrycot and including the anchoring mechanism (7). The action element (6) is made up by an arcuate part one (6') of whose ends is arranged in a pivoting arrangement at the angular end (5') of the cavity (5), the arcuate part being at its other end (6") linked to the pulling rope (8). The action element (6) is fit to act on the bent upper end (9) of a rod (10) pertaining to the anchoring mechanism (7).

4 Claims, 1 Drawing Sheet

DEVICE FOR REMOVABLY FITTING TO PRAMS CARRYCOT SEATS AND CARRYCOTS BEING PROVIDED WITH AN ARTICULATED HANDLE

A device for removably fitting to prams carrycot seats and carrycots being provided with an articulated handle.

BACKGROUND OF THE INVENTION

It is already known to removably fit to a pushchair for babies a baby seat or a carrycot incorporating in an articulated arrangement a rigid handle having the shape of an inverted U, the baby being accommodated in said baby seat or carrycot until after some months it can be already accommodated in the conventional seat being fitted to the pushchair. Said fitting is carried out by means of devices comprising on each side of the pram a holder being fit to removably hold the baby seat or carrycot by means of anchoring mechanisms.

These devices generally comprise a control being fit to simultaneously unlock the two anchoring mechanisms, said control being located on the actual handle as disclosed in the Spanish Utility Model ES-1062629(200300028).

SUMMARY OF THE INVENTION

This invention has as its object a device of the aforementioned type being characterised in that it comprises an action element being arranged in an intermediary arrangement on the anchoring mechanism and assuring the possibility of releasing the carrycot seat or the carrycot only when the handle is in a correct vertical position and thus avoiding incorrect releases that could cause unsafety problems for the baby.

A characterising feature for such a purpose lies in the presence in the first of the two portions making up the device of a cavity housing the action element in a tiltable arrangement, the anchoring mechanism being provided in the second of the aforementioned portions.

This action element is made up by an arcuate part one of whose ends is arranged in a pivoting arrangement at an angular end of the aforementioned cavity, said arcuate part being at its other end linked to the pulling rope, said action element being fit to act on the bent upper end of a rod pertaining to the anchoring mechanism.

The action element is kept in its passive position by the action of a spring being arranged in the aforementioned cavity and acting on said element's end being pulled by the rope.

These and other characterising features will be best made apparent by the following detailed description whose understanding will be made easier by the accompanying sheet of drawings showing a practical embodiment being cited only by way of example not limiting the scope of the present invention.

DETAILED DESCRIPTION

Figure 1:
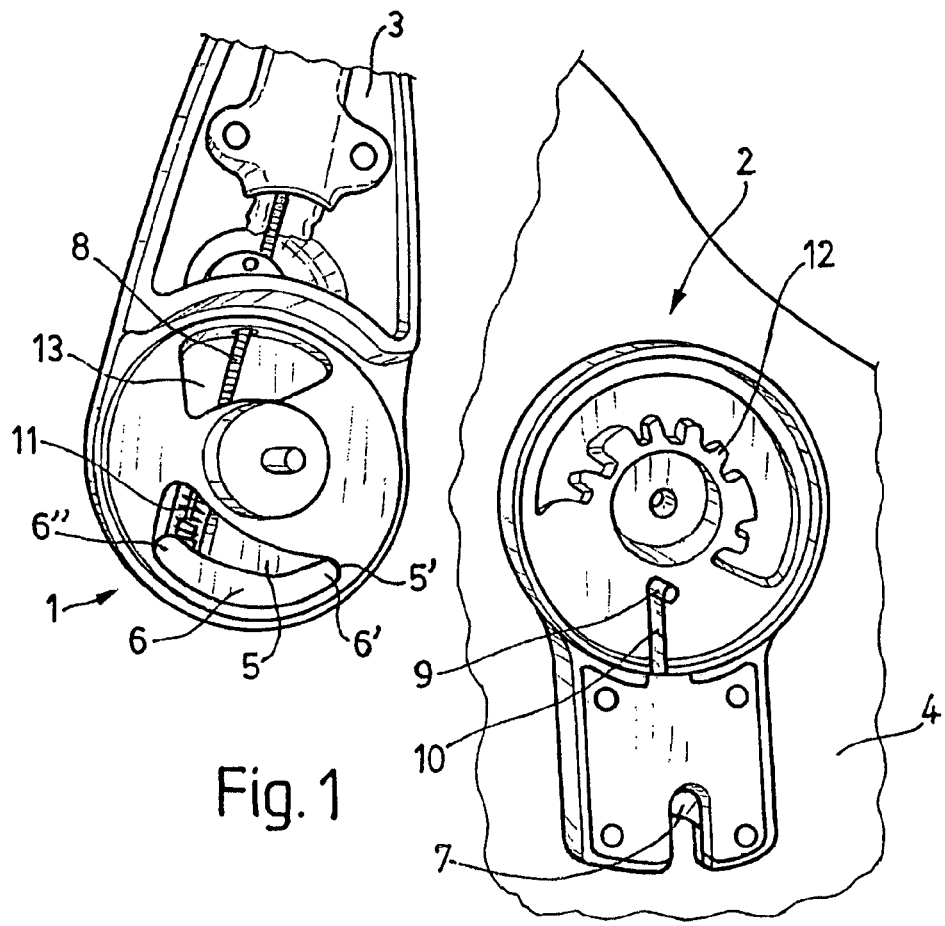
FIG. 1 illustrates the device being the object of the invention and thereby shows in a separate arrangement its first portion with the action element and its second portion with the anchoring mechanism.

According to the drawings the illustrated device for removably fitting carrycot seats and carrycots to prams consists of two portions (1) and (2), the first one of them being solid with the lower end of the handle (3) whereas the second one is solid with the seat (4) or the like.

The first portion (1) has a cavity (5) in an angularly tiltable arrangement housing an action element (6) on the anchoring mechanism (7) being integrated in the second portion (2) of the device.

The action element (6) is made up by an arcuate part one (6') of whose ends is arranged in a pivoting arrangement at the angular end (5') of the cavity (5), said arcuate part being at its other end (6'') linked to the pulling rope (8).

Said action element (6) is fit to act on the bent upper end (9) of a rod (10) pertaining to the anchoring mechanism (7).

In the cavity (5) is arranged a spring (11) acting on the end (6'') of the action element (6) and thereby biasing this element towards the passive position (FIG. 1).

When the two portions (1) and (2) of the device are fitted together the bent end (9) of the rod (10) finds itself in the cavity (5) above the action element (6).

Figure 2:
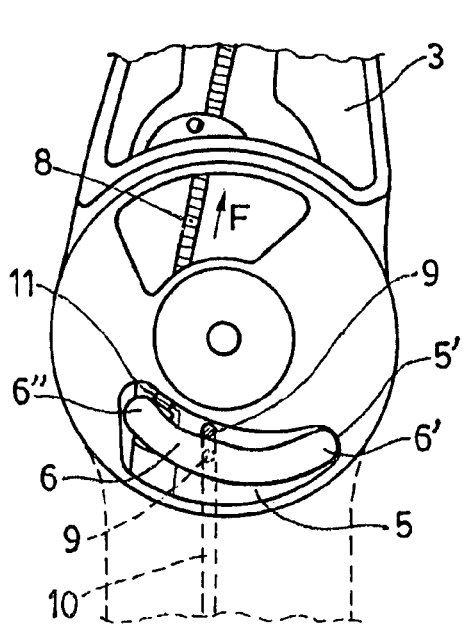
FIGS. 2 and 3 diagrammatically depict the device in a correct and in an incorrect active arrangement, respectively.

With the handle (3) in a vertical position (FIG. 2) it will be possible to release the seat (4) from the pram, this being accomplished by pulling the rope (8) in an upward direction (arrow F) and thereby angularly moving the action element (6) thereby compressing the spring (11) and lifting the rod (10) at its bent end (9), the anchoring element (7) being thereby unlocked.

Figure 3:
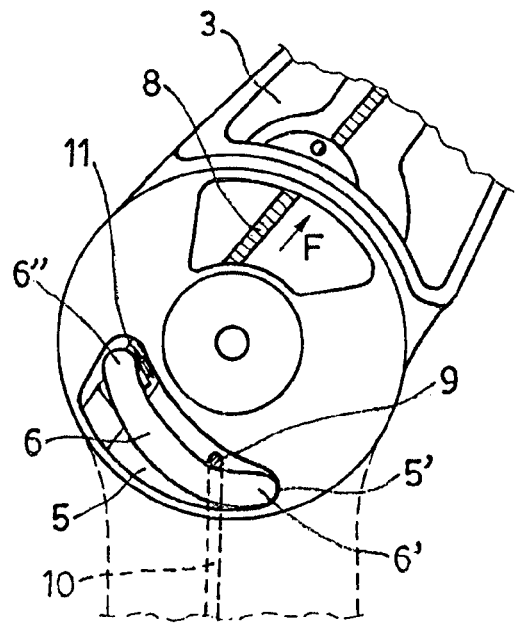

When the handle (3) is in an inclined position (FIG. 3) it is not possible to release the seat (4) from the pram since the bent end (9) then finds itself in the angular region (5') of the cavity (5), the action element (6) having a short travel in said region, said short travel not being sufficient for lifting said bent end (9).

When ceasing the action on the rope (8) the spring (11) forces the action element (6) to regain its passive position (FIG. 1).

This device is prepared in its two portions (1) and (2) for installing means for articulating and locking the handle (3) in different positions, the portion (2) for such a purpose having a toothed region (12) being acted upon by a locking element (not shown) being fit to be tilted in the cavity (13) being provided in the first portion (1).

The invention claimed is:

1. A device for removably fitting to prams, carrycot seats and carrycots having an articulated handle, said device comprising an anchoring mechanism actuated by a line and fitted to respective attachments provided on the pram, wherein the device comprises:

a first portion provided at the lower end of the handle and defining an annularly extending cavity having sides diverging from a first end of the annularly extending cavity to a widened second end of the annularly extending cavity, the annularly extending cavity housing an arcing action element in an angularly tiltable arrangement, the arcing action element having first and second ends; wherein the arcing action element pivots about the first end of the arcing action element at the first end of the annularly extending cavity, wherein said arcing action element is connected at the second end to the line actuating the anchoring mechanism; and a second portion fixed to the carrycot seat or carrycot and comprising said anchoring mechanism.

2. A device for removably fitting to prams, carrycot seats and carrycots as per claim 1, further comprising a spring in the cavity acting on the action element's second end, said spring biasing said action element towards a passive position.

3. A device for removably fitting to prams, carrycot seats and carrycots as per claim 1, wherein the second portion comprises a toothed section to lock the device at different positions.

4. A device for removably fitting to prams, carrycot seats and carrycots having an articulated handle, the device comprising:
- an anchoring mechanism actuated by a line and fitted to attachments on the carrycot and comprising a rod having a bent upper end;
- a first portion provided at the lower end of the handle and defining an annularly extending cavity having diverging sides widening from a first end to a second end of the annularly extending cavity, the annularly extending cavity housing an arcing action element in an angularly tiltable arrangement, the arcing action element having first and second ends; wherein the arcing action element pivots about the first end of the arcing action element at the first end of the annularly extending cavity, wherein said arcing action element is connected at the second end to the line actuating the anchoring mechanism; and
- a second portion fixed to the carrycot seat or carrycot and comprises said anchoring mechanism; wherein the arcing action element engages the bent upper end of the rod.

* * * * *